United States Patent [19]

Paille

[11] 4,087,996

[45] May 9, 1978

[54] METHOD AND APPARATUS FOR CORRECTING DISTORTION IN GAS TURBINE ENGINE BLADES

[75] Inventor: Wilbrod Alfred Paille, Ludlow, Vt.

[73] Assignee: General Electric Company, Lynn, Mass.

[21] Appl. No.: 749,847

[22] Filed: Dec. 13, 1976

[51] Int. Cl.² ............................................. B21K 3/04
[52] U.S. Cl. ................................ 72/38; 29/156.8 B; 72/191; 72/364; 148/130
[58] Field of Search ................. 29/156.8 B, DIG. 6; 148/130, 131; 72/112, 184, 191, 38, 364, 483

[56] References Cited

U.S. PATENT DOCUMENTS

| 2,299,860 | 10/1942 | Stoody et al. | 29/DIG. 6 |
| 2,510,304 | 6/1950 | Ames | 72/483 |

Primary Examiner—Lowell A. Larson
Attorney, Agent, or Firm—Henry J. Policinski; Derek P. Lawrence

[57] ABSTRACT

Gas turbine engine blades and single-die cavities are dynamically balanced on a rotor, transferred to a neutral atmosphere heated chamber and rotated. The centrifugal force distributes sufficient stress on both the blade's platform and airfoil to correct critical geometrical characteristics by creep forming in a relatively short time. The process is not affected by the blade surface irregularities, which cause die damage in conventional opposed-die forming due to high stress concentrations.

16 Claims, 11 Drawing Figures

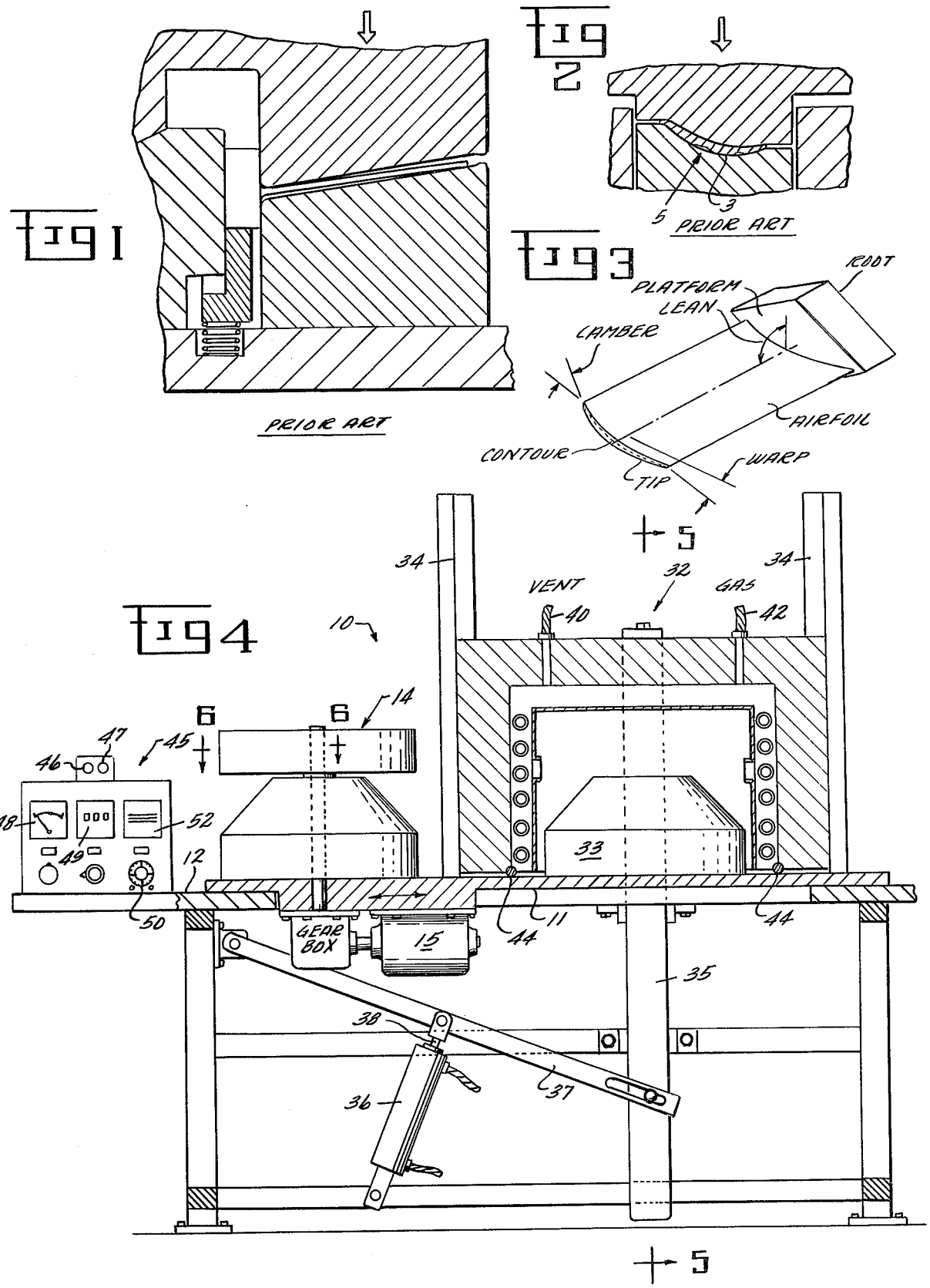

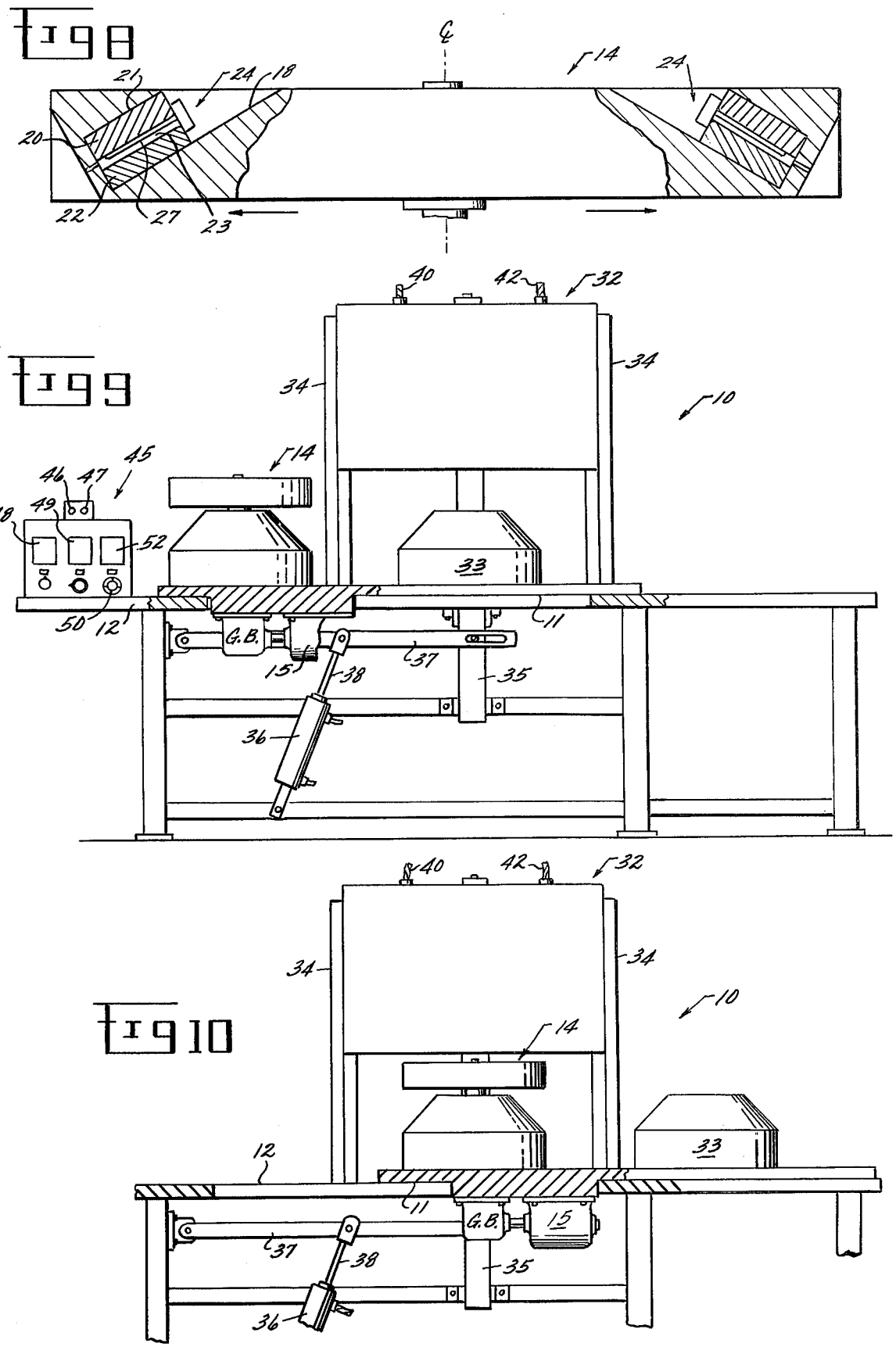

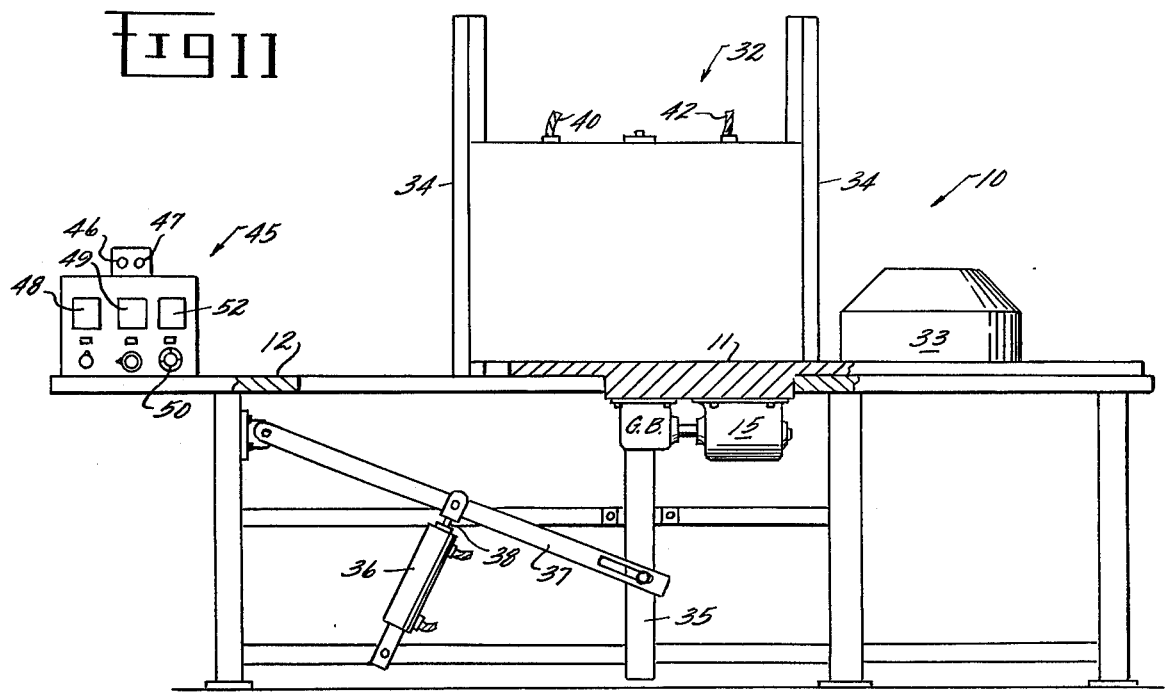

METHOD AND APPARATUS FOR CORRECTING DISTORTION IN GAS TURBINE ENGINE BLADES

BACKGROUND OF THE INVENTION

This invention relates to a method and apparatus for correcting distortion of gas turbine engine compressor blades and vanes (hereafter referred to as blades) primarily in alloys with low temperature creep characteristics, such as titanium alloys.

A widely used method for fabricating blades is by precision forging the airfoil and dovetail platform to net shape, heat treating and finally machining the dovetail. Nearly all blades passing through this process develop unacceptable distortion of the airfoil and its relationship to the platform. The predominant prior art method for correcting this distortion is by manually shaping the blade using special hand and gripping tools to strain into tolerance any particular area of the blade structure which is out of tolerance. Because of the complexity of the blade geometry and the lack of accuracy in this manual procedure correcting one area of the blade often results in adverse effect to other areas requiring additional shaping of the blade. This method of shaping blades is time-consuming and requires a highly skilled technician. A further disadvantage of this manual shaping process is that the mechanical deformation of the blades causing residual stresses to be built up in the blade which reduces fatigue strength and makes them highly unstable. Peening is then necessary to alleviate these detrimental stresses.

Another disadvantage of the prior art techniques for manually shaping gas turbine engine blade structures is that such techniques have proved considerably more difficult in correcting distortions in exteremly resilient high temperature materials such as titanium alloys which are often used in blade construction. Because of their high resiliency titanium alloy blades tend to return to their original shape when subjected to the application of mechanical deformation. Consequently, manual force often fails to correct distortions in such blades resulting in a high rejection rate for titanium blades and a consequent increase in the production costs of such blades.

It is thus obvious that the conventional manual process for shaping gas turbine engine blades is a quite costly, time-consuming, and unsatisfactory technique for reshaping highly resilient high temperature alloys.

Applicant has found that these disadvantages may be overcome by the use of creep forming techniques. Prior art processes for creep forming generally comprise pressuring a specimen between two opposed dies, elevating the temperature of the specimen to the creep range of the material of which it is constructed and maintaining the die pressure until sufficient creep has transpired as illustrated in FIGS. 1 and 2. Such prior art process for creep forming has been found to be unsatisfactory for correcting distortion in gas turbine engine blades. Several problems are encountered when trying to reshape gas turbine engine blades when using opposed dies. One major problem is that due to blade surface irregularities the pressure load on the die is extremely non-uniform resulting in extremely concentrated pressure loads at various points on the surface of the die which correspond to unusually thick proportions of the blade, as best seen in FIG. 2 where high pressure points are shown generally at 3 and low pressure points are shown generally at 5. These concentrated pressures often result in deformation of the dies.

A further problem with such prior art opposed die creep forming techniques is that some blade configurations do not lend themselves to a two-die system. The geometry of these blades is such that when the blades are compressed between opposed dies significantly greater loading is created in some areas of the die than in others. This uneven loading prevents removal of distortion without creating excessive loading on the dies.

It has also been proposed to use single-die techniques for creep forming such as by use of an autoclave. In such prior art methods, gas or hydraulic pressure is used to apply load to a workpiece abutting a single die cavity. However, because of the method of applying pressure and the relatively expensive apparatus required therefore, such prior art systems have been unable to economically achieve the high production rates required when creep forming small parts such as gas turbine engine blades.

OBJECT OF THE INVENTION

It is therefore the primary object of the present invention to provide a method and apparatus for correcting distortion in gas turbine engine blades by creep deformation.

It is a further object of this invention to provide a method and apparatus for reshaping gas turbine blades when a minor design change is required.

It is a further object of this invention to provide a method and apparatus for economically creep forming large quantities of blade structures.

SUMMARY OF THE INVENTION

In accordance with the method of this invention, the severe limitations of opposed-die creep forming are overcome by using a single die system and centrifugal force to apply the required load on the blade.

The blades and single-die cavities are dynamically balanced on a rotor transferred to a neutral atmosphere heated chamber and rotated. The speed of rotation, temperature and duration are maintained sufficiently to reshape the blades to a desired configuration. The exact speed, temperature and duration will depend upon the blade's material, configuration and degree of distortion.

The apparatus for practicing this method comprises a rotor having at its outer periphery a plurality of circumferentially spaced support means for enclosing and supporting a single-die cavity and blade. The support means are equally spaced about the outer circumference of the rotor so as to be dynamically balanced with respect to the axis of rotation of the rotor. The support means includes a recess for supporting a single die cavity and an abutting blade. A motor is provided to rotate the rotor about its center axis in order to create a centrifugal force on the blade to compress it against the die cavity. A heating chamber is disposed to enclose the rotor such that the die rotor and blade may be elevated to the creep temperature of the material of which the blade is constructed. A suitable mechanism may be provided to move the heat chamber away from the blade and die cavity to assist in loading and unloading the blades. The angular position of the die and blade with respect to the axis of rotation of the rotor may be varied by die design in order to selectively control the force distribution on the blade.

Because the applied centrifugal force is in direct proportion to the blade mass the similar stresses are applied to the thicker and thinner sections of the blade. Thus, the combinations of loading achievable by this invention are far superior to those achievable by conventional opposed-die or other methods of applying load for creep forming. Further, the single-die system of this invention overcomes the blade surface profile irregularities which are particularly troublesome to opposed-die creep forming. Die damage, which is caused by load peaks at high points on the blade is eliminated. Additionally, the smoothing out of the load peaks allows the use of brittle ceramic dies which are extremely resistant, non-distorting, and non-oxidizing at high temperature.

The rotation of the dies and workpieces in the heated chamber also has the advantage of rapid heat transfer due to forced convection. The use of centrifugal force to apply the load permits one surface of the blade to be directly exposed to the circulating hot gas.

BRIEF DESCRIPTION OF THE DRAWINGS

The invention may be better understood from the following description in conjunction with the sketches in which:

FIG. 1 is a schematic diagram illustrating a prior art process for creep forming blade structures.

FIG. 2 is a schematic diagram illustrating the force distribution on a blade formed in accordance with a prior art process.

FIG. 3 is a schematic diagram illustrating turbine blade terminology.

FIG. 4 is a cross-sectional view of machinery useful for the practice of the method of this invention.

FIG. 8 is an enlarged view of the rotor portion of the machine of FIG. 4.

FIG. 9 is a schematic diagram of the machinery of FIG. 4 in a different mode of operation.

FIG. 10 is a schematic diagram of the machinery of FIG. 4 in a different mode of operation.

FIG. 11 is a schematic diagram of the machinery of FIG. 4 in a different mode of operation.

DESCRIPTION OF THE PREFERRED EMBODIMENT

Figure 5:
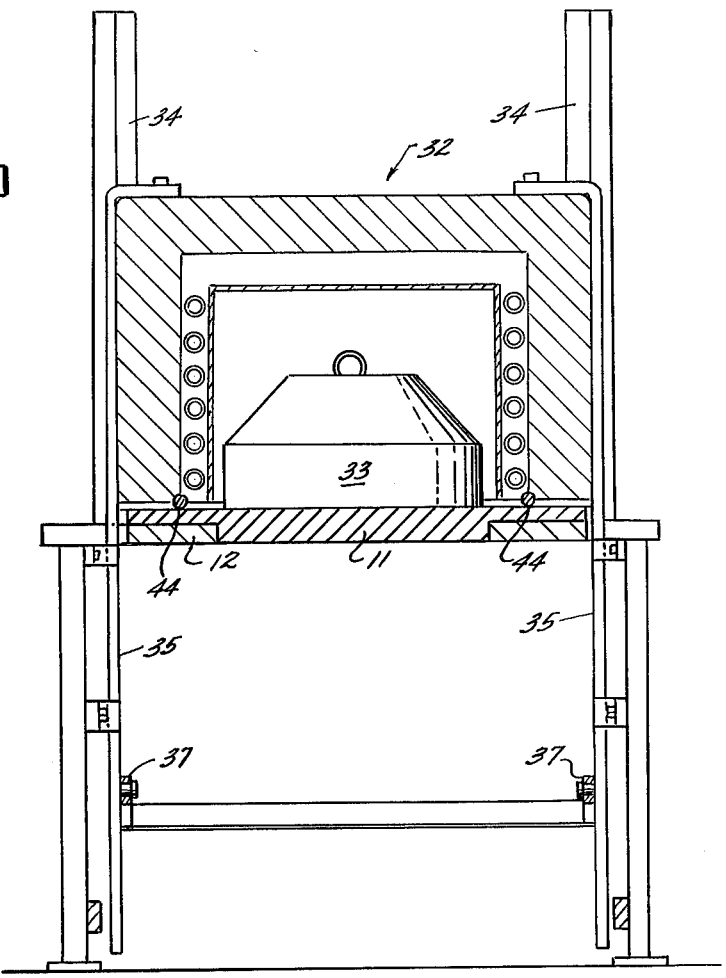
FIG. 5 is a cross-sectional view taken along the line 5—5 of FIG. 4.
Figure 6:
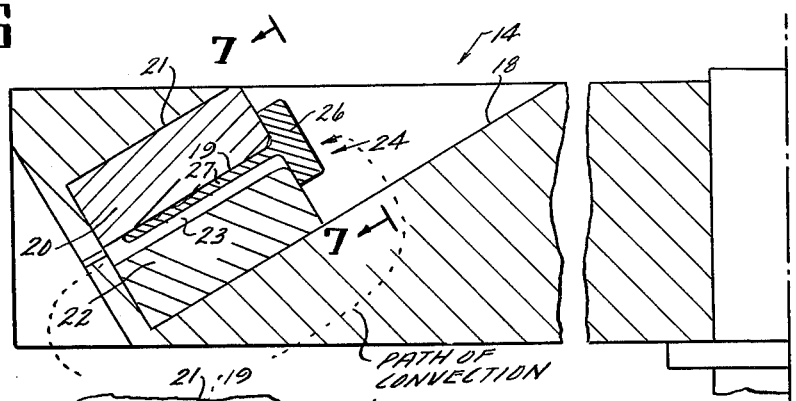
FIG. 6 is an enlarged cross-sectional view taken along the line 6—6 of FIG. 4.
Figure 7:
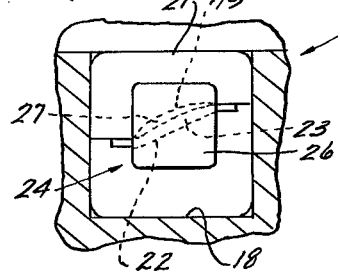
FIG. 7 is an enlarged cross-sectional view taken along the line 7—7 of FIG. 6.

Referring to FIGS. 4 through 11 therein is shown a machine 10 useful for the practice of the method of this invention. The machine 10 includes a table 11 translatably mounted on a base 12 including an actuating mechanism (not shown) for translating the table II along the base 12. Table II supports a rotor 14 and a motor 15 for rotating the rotor 14 through a suitable gearbox. Disposed at opposite ends of the outside periphery of the rotor 14 are a pair of recesses 18 which are inclined to the angle of rotation of the rotor 14. As best seen in FIGS. 6 and 8, the recesses 18 receive a single die 20 having a cavity 19 disposed therein. The die 20 abuts the outermost wall 21 of the recess 18 to aid in positioning a gas turbine engine blade shown generally at 24 in the recess 18. A support die 22 may also be placed in the recess 18 in a position to abut the innermost wall 23 of recess 18. The blade 24 is placed within recess 18 intermediate the dies 20 and 22 such that the face of the blade airfoil portion 27 abuts the die 20 leaving a space 23 between the blade airfoil 27 and support die 22 as best seen in FIG. 6. The opening to recess 18 which remains after the dies 20 and 22 have been inserted therein is narrower than the blade platform 26 such that when the blade airfoil 27 is inserted into the cavity 18, blade platform 26 spans the remaining opening to recess 18 as best seen in FIG. 7. This permits the blade 24 to be accurately positioned in the recess 18 with respect to the single die 20. Recesses 18 are equally spaced around the outer circumference of the rotor 14 so as to be dynamically balanced with respect to the axis of rotation of the rotor 14. While only two recesses have been shown, additional recesses may be disposed about the outer circumference of the rotor 14 in order to increase the blade forming capacity of the machine 10. If additional recesses are used, they must be equally spaced around the circumference of the rotor 14 so as to be dynamically balanced.

The dies are inclined with respect to the axis of rotation of the rotor 14 to allow the force to be applied to both the blade's platform 26 and airfoil 27 to thereby correct and control the blade's "Lean" characteristics as illustrated in FIG. 3. At the same time the die 20 is used to correct the bow, warp, and camber of the blade airfoil portion 27 as illustrated in FIG. 3. Increasing or decreasing the angle of die 20 with respect to the axis of rotation of rotor 14 controls the force ratio between the airfoil and the platform portions of blade 24. By suitable selection of the geometry of the dies 20 and 22 the die angle may be varied to provide the force distribution required.

The smooth pressures generated by centrifugal force enables the use of extremely high temperature, but brittle materials for construction of the single die cavity 22, which because of this brittleness, are unacceptable for use in opposed die creep forming applications. A preferred material for this purpose is stabilized zirconium oxide.

In order to elevate the temperature of the blade 24 to creep range a heating chamber 32 is provided. The heating chamber 32 is supported on the base 12 by suitable guide members 34. The chamber 32 is slidably mounted on the guide members 34 such that it may be raised and lowered away from the table 1 to permit the table 1 to be translated in order to position the rotor 14 under the heat chamber 32. A suitable hydraulically operated cylinder 36, lever arm 37, and reciprocating shaft 38 are provided to elevate and lower the heating chamber 32 to and away from the table 11 through an actuating arm 35 connected to the chamber 32. The chamber 32 includes vent line 40 and a gas line 42 used to provide an inert gas such as argon to the chamber 32 in order to prevent oxidation of the blades. A seal member 44 is provided at the lower end of the chamber 32 in order to seal the chamber 32 against gas leakage when abutting the table 11.

A heat retention plug 33 is mounted on the table 1 in a position to be enveloped by the heat chamber 32 when in a lowered position and assist in maintaining the elevated temperature in chamber 32 when it is not covering the rotor 14.

The motor 15 is of sufficient capacity to rotate the rotor 14 at the speed required to produce the necessary centrifugal force on the blade. In some applications forces exceeding 1,000 g's may be required. The heating chamber 32 should have the capacity to produce temperatures sufficient to creep all blade materials expected to be used. For titanium blades creep is done within the alpha/beta range, i.e. less than 1850° F.

The blades are heated by conduction, forced convection, and radiation. The path of convection heating is best illustrated in FIGS. 5 and 6. The spinning rotor 14 pumps hot gas through the space 23 between the dies 20 and 22 to provide extremely efficient and rapid heating of the blades.

Suitable controls 45 well-known in the art are provided to operate the machine 10 and monitor the process. These controls include switches 45, 46 and 47 to activate the motor 15 and the cylinder 36 respectively; temperature controller 52 to maintain a selected temperature in the chamber 32, tachometer 48 to monitor the speed of rotation of the rotor 14; temperature indicator 49 to monitor the temperature in the chamber 32 and clock 50 to monitor the elapsed time of rotation of the rotor 14.

Referring to FIGS. 4 and 9 through 11 therein is shown the machinery of this invention in alternate modes of operation. Initially, as shown in FIG. 4 the heat chamber 32 is off and in a closed position abutting the table 11 and enveloping the heat plug 33. The rotor 14 is stopped. A single die 20, support die 22 and a blade from which distortions are to be removed are placed in each of the recesses 18 as shown in FIG. 6 in a position such that the die 20 abuts the outermost wall 21 of recess 18 and the blade 24 is disposed intermediate dies 20 and 22. The switch 47 is then activated to elevate the heating chamber 34 as best seen in FIG. 9. At this time an inert gas is supplied to the line 42 in order to purge the chamber 32. Thereafter a switch (not shown) is activated to translate the rotor 14 under the heat chamber 34 as best seen in FIG. 10. Thereafter the switch 47 is activated to lower the heating chamber 32 to enclose the rotor 14 as best seen in FIG. 11. The temperature of the heating chamber is then set to the temperature necessary to creep the blade material and the rotor motor 15 through switch 46 is activated to create a centrifugal force on the blade 24. This centrifugal force pushes the blade 24 against the single-die cavity 20 to thereby produce creep stresses within the blade 24. This centrifugal force is maintained for a sufficient length of time to conform the face of the blade abutting the single-die cavity 20 to the shape of the die cavity 20. Any thickness variations within the blade will consequently be trasnferred to the non-abutting face of the blade 24. The length of time which this centrifugal force will need to be applied will depend on the magnitude of the centrifugal force, the temperature of the blade and the resiliency of the blade. For a typical titanium blade, a force of 500 g's applied at a temperature of 1350° F for 4 minutes has been found to be sufficient to remove distortions to a satisfactory degree. After the blades have been formed, the rotor is stopped and the chamber 32 elevated as shown in FIG. 10. The rotor 14 then translated from under the heat chamber 32 to permit unloading and reloading of the blades as shown in FIG. 9. The heat chamber is then lowered to cover the heat plug 33 as shown in FIG. 4.

The process of this invention is thus far superior to prior art processes for removing distortions from gas turbine engine blades. The smooth pressures exhibited by this centrifugal force enables accurate forming of extremely resilient high temperature materials such as titanium and the forming of a wide variety of blade shapes without the creation of excessive stress concentrations on the die.

While the process and machinery of this invention have particular utility in the removal of distortions in gas turbine engine blades it is not limited to this application. The machinery and process described herein are applicable to creep forming a wide variety of structures. For example, the single and support dies could be modified to accommodate a wide variety of shapes. Further, while the process and machinery of this invention has particular utility in the forming of titanium structures other metal and metal alloy structures may be creep formed using the teachings of this invention.

Therefore, having described a preferred embodiment of the invention though not exhaustive of all possible equivalents, what is desired to be secured by Letters Patent of the United States is claimed below:

1. A method of forming metallic structures comprising:
    placing the cavity formed by a single die in abutting relationship to the face of the structure which is desired to be formed,
    heating the structure to the creep temperature of the material of which it is constructed,
    applying centrifugal force to compress the structure against the die cavity by rotating the structure and die cavity,
    maintaining the centrifugal force and creep temperature a sufficient length of time to conform the abutting face of the structure to the shape of the cavity.

2. The method of claim 1 wherein the metallic structure comprises a gas turbine engine blade.

3. The method of claim 1 wherein the structure and die are arranged on a rotor in a dynamically balanced manner with the die rigidly supported at a point further away from the axis of rotation of the rotor than the structure.

4. The method of claim 3 further comprising the step of adjusting the angular position of the die cavity and abutting structure relative to the axis of rotation of the rotor prior to the application of centrifugal force in order to achieve a desired distribution of the centrifugal force on the structure.

5. Apparatus for forming metallic structures comprising a rotor,
    a plurality of support means equally spaced around the outer circumference of the rotor for enclosing and supporting respective die members, each die member including a cavity disposed therein in abutting engagement with a metallic structure to be formed,
    means for heating the metallic structures to their creep temperature, and
    means for rotating the rotor at a high speed to produce a centrifugal force to compress the heated metallic structures against the respective abutting die cavities whereby the faces of the structures are conformed to the shape of the respective abutting die cavities.

6. The apparatus of claim 5 wherein the metallic structure is heated by radiation, conduction and by forced convection resulting from the rotor motion.

7. The apparatus of claim 5 wherein each support means comprises a recess disposed in the rotor.

8. The apparatus of claim 7 wherein the recess is inclined to the axis of rotation of the rotor.

9. The apparatus of claim 8 wherein a support die is disposed in each recess spaced apart from the die member to aid in positioning the metallic structure within the recess.

10. The apparatus of claim 9 wherein the geometry of the die members and supporting dies is selected to maintain a predetermined angular position between the die cavities and respective abutting metallic structures relative to the axis of rotation of the rotor in order to achieve a desired distribution of applied centrifugal force on the metallic structure.

11. The apparatus of claim 6 wherein the heating means comprises a heat chamber movable to a position to enclose the rotor and support means.

12. The apparatus of claim 11 further comprising means for translating the heat chamber to and away from the rotor.

13. The apparatus of claim 12 wherein the translating means comprises means for elevating and lowering the heat chamber, and means for translating the rotor to and away from axial alignment with the heat chamber.

14. The apparatus of claim 5 further comprising means for monitoring the rotational speed of the rotor, the temperature of the heat chamber and the elasped time of rotation of the rotor.

15. The apparatus of claim 9 wherein the metallic structures comprise gas turbine engine blades each having an airfoil portion extending from a wider platform portion and wherein the space between respective die members and support dies is narrower than the blade platform but wider than the blade airfoil portion such that when the die member support die and blade airfoil are disposed in their respective recesses the blade platform spans the remaining opening to the recess to thereby maintain the blade airfoil in a predetermined position with respect to the axis of rotation of the rotor and also so that a space is provided between the blade airfoil and support die to permit convection heating during rotation of the rotor.

16. The apparatus of claim 15 wherein respective blades, die members and support dies are disposed in the recesses such that the die members abut the outermost wall of the recess and the blade airfoil portion is disposed intermediate the die member and support die with the face of the blade airfoil to be formed abutting the cavity formed in the die member.

* * * * *